US012620198B2

(12) United States Patent
Sato et al.

(10) Patent No.: US 12,620,198 B2
(45) Date of Patent: May 5, 2026

(54) INFORMATION PROCESSING SYSTEM AND INFORMATION PROCESSING METHOD

(71) Applicant: Panasonic Intellectual Property Corporation of America, Torrance, CA (US)

(72) Inventors: Satoshi Sato, Kyoto (JP); Yasunori Ishii, Osaka (JP); Kunio Nobori, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 287 days.

(21) Appl. No.: 18/381,420

(22) Filed: Oct. 18, 2023

(65) Prior Publication Data

US 2024/0045636 A1     Feb. 8, 2024

Related U.S. Application Data

(63) Continuation of application No. PCT/JP2022/018134, filed on Apr. 19, 2022.

(30) Foreign Application Priority Data

Apr. 22, 2021     (JP) ................................. 2021-072837

(51) Int. Cl.
　　*G06V 10/74* 　　　　(2022.01)
　　*G09G 5/373* 　　　　(2006.01)
(52) U.S. Cl.
　　CPC ........... *G06V 10/761* (2022.01); *G09G 5/373* (2013.01)

(58) Field of Classification Search
　　None
　　See application file for complete search history.

(56) References Cited

U.S. PATENT DOCUMENTS 8,749,694 B2 *　6/2014　Georgiev ............... H04N 23/60
　　　　　　　　　　　　　　　　　　348/335
10,719,301 B1 *　7/2020　Dasgupta ............. G06N 3/0464
(Continued)

OTHER PUBLICATIONS

International Search Report (ISR) from International Searching Authority (Japan Patent Office) in International Pat. Appl. No. PCT/JP2022/018134, dated Jul. 12, 2022, together with an English language translation.
(Continued)

*Primary Examiner* — Soo Shin
(74) *Attorney, Agent, or Firm* — Greenblum & Bernstein, P.L.C.

(57) ABSTRACT

An imaging control device includes an image acquiring part that acquires a first training image of a machine learning model, a display control part that causes a display device to display the first training image based on a distance between the display device and an imaging device that acquires a blurred image, an imaging control part that causes the imaging device to capture the first training image to acquire a second training image, and a storage control part that stores a data set including a set of the second training image and correct answer information. The display control part changes, when the distance is changed, a display size of the first training image so that a size of the second training image acquired by the imaging device is maintained. The imaging control part causes the imaging device to capture the first training image when the distance is changed.

13 Claims, 12 Drawing Sheets

(56) References Cited

U.S. PATENT DOCUMENTS

2021/0075953 A1\*  3/2021  Ono ..................... H04N 23/698
2021/0182584 A1\*  6/2021  Ionita .................. G06V 10/772

OTHER PUBLICATIONS

Tan et al., "Face Detection and Verification Using Lensless Cameras", IEEE Transactions on Computational Imaging, vol. 5, No. 2, pp. 180-194, 2019.

\* cited by examiner

| 1 | 2 | 3 | 4 | 5 |
|---|---|---|---|---|

2023

2024

302

51

301

304    306

52

303    305

INFORMATION PROCESSING SYSTEM AND INFORMATION PROCESSING METHOD

TECHNICAL FIELD

The present disclosure relates to a technique that creates a data set to be used for training a machine learning model.

BACKGROUND ART

For example, Non-Patent Literature 1 discloses a method for displaying an image captured by a normal camera on a display and causing the lensless camera to capture the image displayed on the display to create a data set for training a face detection model using the lensless camera.

However, in a case where the image displayed on the display is captured as in the conventional art to create a data set, a training data set including training images that are blurred variously depending on the distance between the display and the camera is not created. Thus, it is difficult to improve recognition accuracy of a machine learning model while protecting the privacy of a subject.

CITATION LIST

Non Patent Literature

Non-Patent Literature 1: Jasper Tan, Li Niu, Jesse K. Adams, Vivek Boominathan, Jacob T. Robinson, and Richard G. Baraniuk, "Face Detection and Verification Using Lensless Cameras", IEEE Transactions on Computational Imaging, vol. 5, No. 2, pp. 180-194, 2019

SUMMARY OF INVENTION

The present disclosure has been made to solve the above problem, and an object of the present disclosure is to provide a technique that enables improvement of recognition accuracy of a machine learning model while protecting privacy of a subject.

An information processing system of the present disclosure includes an image acquiring part that acquires a first training image of a machine learning model from a first storage part, a distance acquiring part that acquires a distance between a display device and an imaging device that acquires a blurred image by imaging, a display control part that causes the display device to display the first training image based on the distance, an imaging control part that causes the imaging device to capture the first training image displayed on the display device to acquire a second training image, and a storage control part that stores a data set including a set of the second training image acquired by the imaging device; and correct answer information associated with the first training image in a second storage part. The display control part changes, when the distance is changed, a display size of the first training image so that a size of the second training image acquired by the imaging device is maintained, and causes the display device to display the first training image having the changed display size. The imaging control part causes the imaging device to capture the first training image when the distance is changed.

According to the present disclosure, it is possible to improve recognition accuracy of a machine learning model while protecting the privacy of a subject.

BRIEF DESCRIPTION OF DRAWINGS

FIG. 4 is a schematic view for describing a positional relationship between a display device and the imaging device in the first embodiment.

DESCRIPTION OF EMBODIMENTS

Knowledge Underlying Present Disclosure

Figure 1:
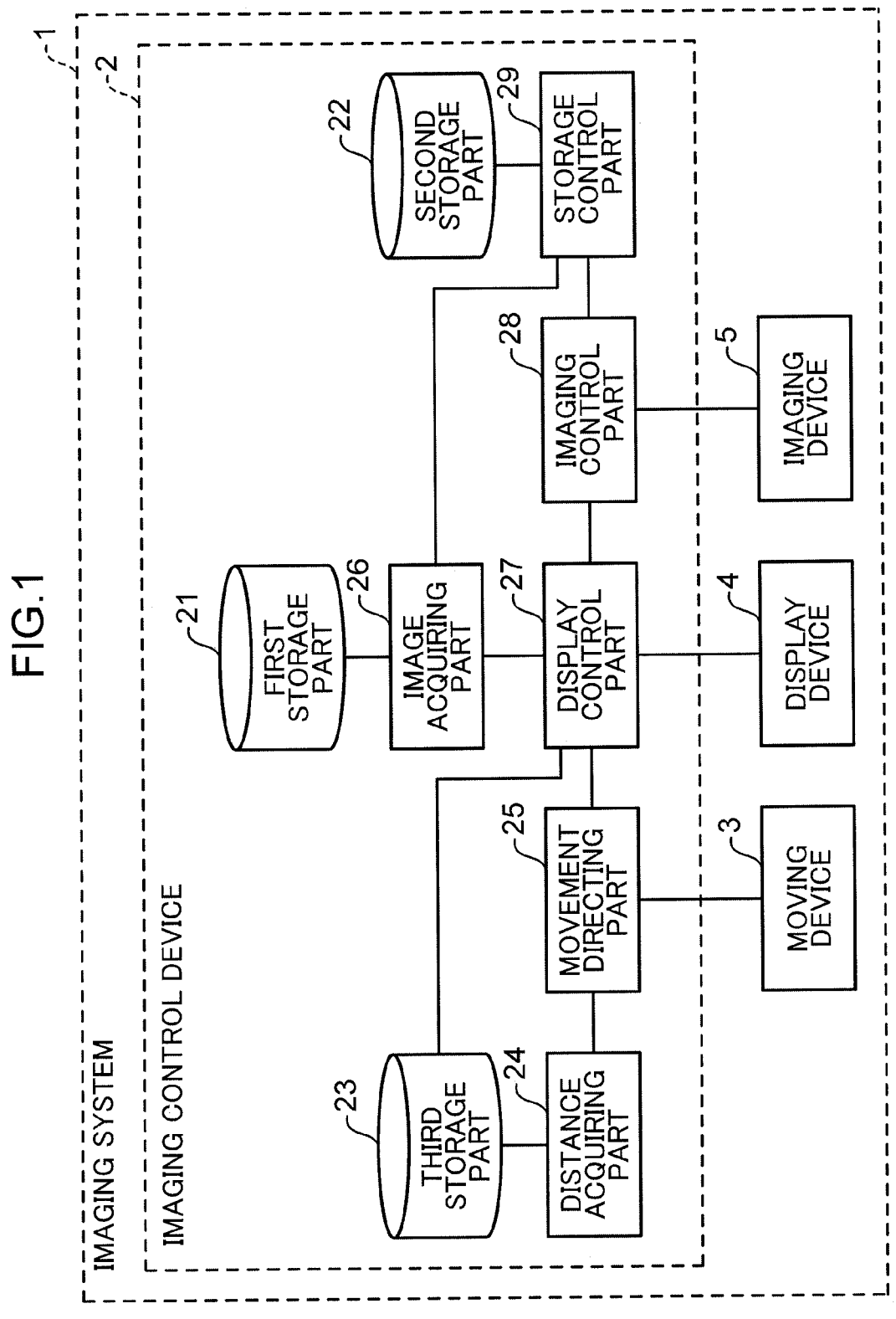
FIG. 1 is a block diagram illustrating an example of an overall configuration of an imaging system according to a first embodiment of the present disclosure.

In home, indoor, or the like, various recognition techniques are important, such as behavior recognition of a person in an environment or person recognition of a device operator. In recent years, a technique called deep learning has attracted attention for object recognition. The deep learning is machine learning using a neural network having a multilayer structure, and by using a large amount of training data, the deep learning enables more accurate recognition performance to be achieved than by a conventional method. In such object recognition, image information is particularly effective. Various methods have been proposed for greatly improving a conventional object recognition capability by using a camera as an input device and performing deep learning using image information as an input.

Unfortunately, disposing a camera in home or the like causes a problem that privacy is violated when a captured image leaks to the outside due to hacking or the like. Thus, a countermeasure is required to protect privacy of a subject even when a captured image leaks to the outside.

For example, as a camera for obtaining a blurred image that is difficult to be visually recognized by a person, there is provided a multi-pinhole camera. Images captured by the multi-pinhole camera are difficult to be visually recognized by a person due to blurring that is intentionally created due to an influence such as superimposition of multiple images each having a different viewpoint, or a subject image that is less likely to be focused due to non-use of a lens. Thus, the images captured by the multi-pinhole camera are preferably used to construct an image recognition system in an environment requiring privacy protection, such as home or indoor.

In the image recognition system, a target area is imaged by the multi-pinhole camera, and a captured image is input to an identifier. This configuration allows the identifier to identify a face included in the input captured image using a learned identification model. When the target area is imaged by the multi-pinhole camera, privacy of a subject can be protected even if the captured image leaks to the outside. This is because the captured image is difficult to be visually recognized by a person.

In order to train such an identifier, Non-Patent Literature 1 discloses an imaging method for displaying an image captured by a normal camera on a display and causing the lensless camera to capture the image displayed on the display to create a training data set. However, in the multi-pinhole camera and the lensless camera, the degree of superimposition of multiple images changes depending on a distance to a subject, and captured images having different degrees of blurring can be acquired. However, with the conventional imaging method, only one blurred image depending on the distance between the camera and the display can be acquired from one image displayed on the display. The degree of blurring of the captured image to be actually used for image recognition may be different from the degree of blurring of the captured image used for training. Therefore, in a case where a machine learning model is trained by using a captured image captured with the conventional imaging method, it is difficult to improve the recognition accuracy of the machine learning model.

Therefore, the present inventors have devised an information processing method for capturing an image displayed on a display while changing the distance between a display and a camera at the stage of accumulating a training data set. As a result, the training data set including training images that are blurred various depending to the distance between the display and the camera can be accumulated. Thus, it is found that the recognition accuracy of the machine learning model can be improved while the privacy of a subject is protected, and the present disclosure has been conceived.

In order to solve the above problem, an information processing system according to an aspect of the present disclosure includes an image acquiring part that acquires a first training image of a machine learning model from a first storage part, a distance acquiring part that acquires a distance between a display device and an imaging device that acquires a blurred image by imaging, a display control part that causes the display device to display the first training image based on the distance, an imaging control part that causes the imaging device to capture the first training image displayed on the display device to acquire a second training image, and a storage control part that stores a data set including a set of the second training image acquired by the imaging device and correct answer information associated with the first training image in a second storage part. The display control part changes, when the distance is changed, a display size of the first training image so that a size of the second training image acquired by the imaging device is maintained, and causes the display device to display the first training image having the changed display size. The imaging control part causes the imaging device to capture the first training image when the distance is changed.

According to this configuration, the first training image of the machine learning model is displayed on the display device, and the imaging device is caused to capture the first training image displayed on the display device to acquire the second training image. The imaging device acquires a blurred image by imaging. The data set including the set of the second training image acquired by the imaging device and the correct answer information is stored in the second storage part. Then, when the distance between the display device and the imaging device is changed, the display size of the first training image is changed so that the size of the second training image acquired by the imaging device is maintained, and the first training image having the changed display size is displayed on the display device. Then, when the distance is changed, the first training image is captured by the imaging device.

Therefore, the data set including the set of training images that are various blurred depending to the distance between the display device and the imaging device and correct answer information can be accumulated, and the recognition accuracy of the machine learning model can be improved while the privacy of a subject is protected.

Further, the above information processing system may further include a change directing part that directs a change of the distance between the display device and the imaging device.

According to this configuration, since the change of the distance between the display device and the imaging device is directed, the distance between the display device and the imaging device can be changed to a predetermined distance, and the training image having a desired degree of blurring depending on the changed distance can be acquired.

Further, in the above information processing system, the change directing part may direct the change of the distance more than once, the display control part may change the display size of the first training image so that the size of the second training image acquired by the imaging device is maintained every time the distance is changed more than once, and cause the display device to display the first training image having the changed display size, the imaging control part may cause the imaging device to capture the first training image every time the distance is changed more than once to acquire a plurality of the second training images, and the storage control part may store a data set including a set of each of the plurality of the second training images acquired by the imaging device and the correct answer information in the second storage part.

According to this configuration, the distance between the display device and the imaging device is changed more than once, and the plurality of the second training images having different degrees of blurring is acquired for one first training image. Therefore, the data set including the set of each of the plurality of the training images having different degrees of blurring and the correct answer information can be accumulated.

Further, in the above-described information processing system, the change directing part may direct a moving device that moves at least one of the imaging device and the display device to move at least one of the imaging device and the display device.

According to this configuration, the distance between the imaging device and the display device can be automatically changed, and thus the work of moving at least one of the imaging device and the display device performed by the user can be reduced.

Further, in the above-described information processing system, the change directing part may move at least one of the imaging device and the display device in an optical axis direction of the imaging device.

According to this configuration, since at least one of the imaging device and the display device is moved in the optical axis direction of the imaging device, the distance in the optical axis direction between the display device and the imaging device can be changed.

Further, in the above-described information processing system, the change directing part may move at least one of the imaging device and the display device in a direction intersecting the optical axis direction of the imaging device.

According to this configuration, in a case where the second training image is affected by a vignetting due to an optical system of the imaging device, at least one of the imaging device and the display device is moved in the direction intersecting the optical axis direction of the imaging device. This makes it possible to obtain a plurality of training images differently affected by the vignetting for one subject.

Furthermore, in the above information processing system, the distance acquiring part may acquire the distance from a distance measuring device that measures the distance between the display device and the imaging device.

According to this configuration, even if the distance between the display device and the imaging device is manually changed by the user, the distance is acquired from the distance measuring device that measures the distance between the display device and the imaging device. Thus, the display size of the first training image can be changed depending on the measured distance.

Further, in the above-described information processing system, the first training image stored in the first storage part may be an image without blurring acquired by another imaging device different from the above-described imaging device.

According to this configuration, the first training image, which is an image without blurring, is captured by the imaging device, thereby acquiring the second training image with blurring.

Further, in the above-described information processing system, the display control part may change the display size of the first training image in proportion to the distance between the display device and the imaging device.

According to this configuration, since the display size of the first training image is changed in proportion to the distance between the display device and the imaging device, the display size of the first training image that is proportional to the distance can be easily determined by acquiring the distance between the display device and the imaging device.

The information processing system may further include a training part that trains the machine learning model using the data set that is stored in the second storage part and includes the set of the second training image and the correct answer information.

According to this configuration, the machine learning model is trained by using the data set that is stored in the second storage part and includes the set of the second training image and the correct answer information, thus improving the recognition capability of the machine learning model for recognizing the subject from the captured image having the degree of blurring depending on the distance to the subject.

Further, in the above information processing system, the correct answer information associated with the first training image may be stored in the first storage part, and the storage control part may acquire the correct answer information from the first storage part.

According to this configuration, the data set including the set of each of the training images that are blurred variously depending to the distance between the display device and the imaging device and correct answer information can be accumulated, and the recognition accuracy of the machine learning model can be improved while the privacy of a subject is protected.

Furthermore, in the above information processing system, the correct answer information associated with the first training image is stored in the first storage part, and the image acquiring part may acquire the correct answer information from the first storage part to output the acquired correct answer information to the storage control part.

According to this configuration, the data set including the set of each of the training images that are blurred variously depending to the distance between the display device and the imaging device and correct answer information can be accumulated, and the recognition accuracy of the machine learning model can be improved while the privacy of a subject is protected.

The present disclosure can be implemented not only as the information processing system having the characteristic configuration as described above, but also as an information processing method or the like for executing characteristic processing corresponding to the characteristic configuration of the information processing system. Therefore, even other aspects below can achieve an effect as in the above information processing system.

An information processing method according to another aspect of the present disclosure with which a computer performs the method including acquiring a first training image of a machine learning model from a first storage part, acquiring a distance between a display device and an imaging device that acquires a blurred image by imaging, causing the display device to display the first training image based on the distance, causing the imaging device to capture the first training image displayed on the display device to acquire a second training image, and storing a data set including a set of the second training image acquired by the imaging device and correct answer information associated with the first training image in a second storage part. In the displaying of the first training image, when the distance is changed, a display size of the first training image is changed so that a size of the second training image acquired by the imaging device is maintained, and the display device is caused to display the first training image having the changed display size. In the acquiring of the second training image, when the distance is changed, the imaging device is caused to capture the first training image.

Embodiments of the present disclosure will be described below with reference to the accompanying drawings. The following embodiments are examples embodying the present disclosure, and are not intended to limit a technical scope of the present disclosure.

First Embodiment

FIG. 1 is a block diagram illustrating an example of an overall configuration of an imaging system 1 according to a first embodiment of the present disclosure.

The imaging system 1 includes an imaging control device 2, a moving device 3, a display device 4, and an imaging device 5.

The display device 4 is, for example, a liquid crystal display device or an organic electro luminescence (EL) display device. The display device 4 is controlled by the imaging control device 2 and displays an image output from the imaging control device 2. Note that the display device 4 may be a projector that projects an image on a screen.

The imaging device 5 is, for example, a computational imaging camera such as a lensless camera, a coded aperture camera, a multi-pinhole camera, a lensless multi-pinhole camera, or a light-field camera. The imaging device 5 acquires a blurred image by imaging.

The imaging device 5 is disposed at a position where a display screen of display device 4 can be imaged. The imaging device 5 in the first embodiment is a lensless multi-pinhole camera in which a mask having a mask pattern having a plurality of pinholes is provided to cover a light receiving surface of an imaging element. In other words, it can be said that the mask pattern is provided between a subject and the light receiving surface.

Unlike a normal camera that captures a normal image without blurring, the imaging device 5 captures a computational image serving as an image with blurring. The computational image is an image from which, due to intentionally created blurring, a person cannot recognize a subject even if the person sees the image itself.

Figure 2:
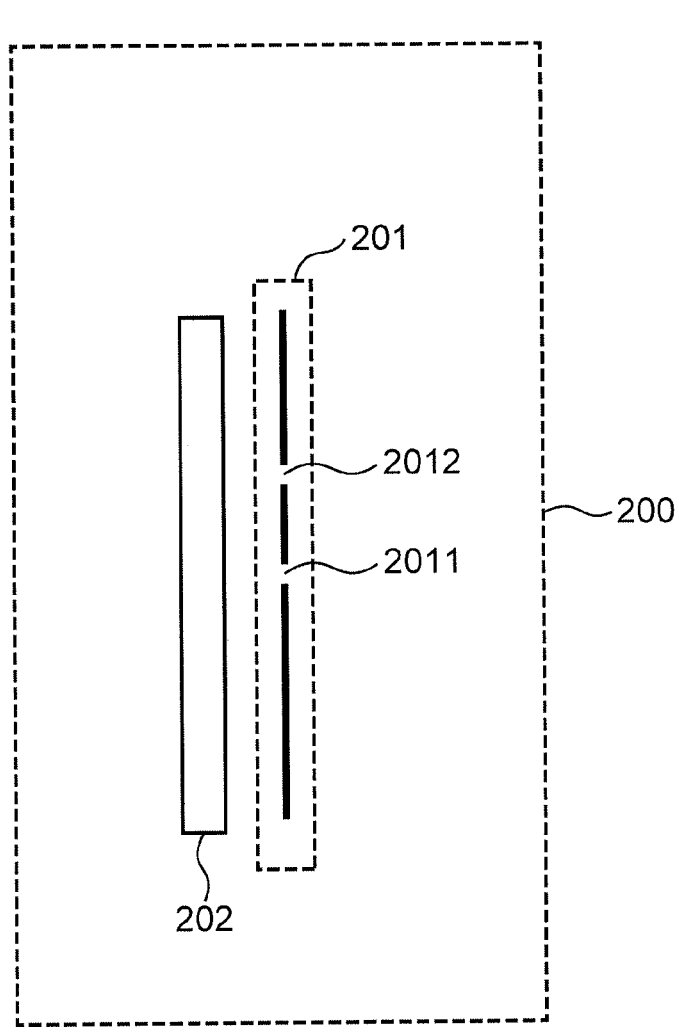
FIG. 2 is a view schematically illustrating a structure of a multi-pinhole camera as one example of an imaging device.

FIG. 2 is a view schematically illustrating a structure of a multi-pinhole camera 200 as one example of the imaging device 5. FIG. 2 is a top view of the multi-pinhole camera 200.

The multi-pinhole camera 200 illustrated in FIG. 2 includes a multi-pinhole mask 201 and an image sensor 202 such as a complementary metal oxide semiconductor (CMOS). The multi-pinhole camera 200 does not have a lens. The multi-pinhole mask 201 is disposed at a predetermined interval from the light receiving surface of the image sensor 202. The multi-pinhole mask 201 has a plurality of pinholes 2011 and 2012 arranged at random or at equal intervals. The pinholes 2011 and 2012 are also referred to as multi-pinholes. The image sensor 202 acquires a captured image acquired by capturing an image displayed on the display device 4 through each of the pinholes 2011 and 2012. The image acquired through the pinholes is referred to as a pinhole image.

The pinhole image of the subject is different depending on the position and size of each of the pinholes 2011 and 2012. Therefore, the image sensor 202 acquires a superimposed image in a state where a plurality of pinhole images is superimposed in a slightly shifted manner (multiple image). The pinholes 2011 and 2012 have a positional relationship that affects a positional relationship among the pinhole images projected onto the image sensor 202 (i.e., a degree of superimposition of multiple images). The sizes of the pinholes 2011 and 2012 affect the degree of blurring of the pinhole images.

Using the multi-pinhole mask 201 enables acquiring a plurality of pinhole images each having a different position and a different degree of blurring while superimposing the images. That is, a computational image in which multiple images and blurring are intentionally created can be acquired. Thus, the captured image is a multiple and blurred image, whose blurring enables acquisition of an image in which privacy of a subject is protected.

In addition, by changing the number of pinholes, the positions of the pinholes, and the sizes of the pinholes, images with different degrees of blurring can be acquired. That is, the multi-pinhole mask 201 may be configured to be easily detachable by the user. A plurality of types of the multi-pinhole masks 201 having different mask patterns may be prepared in advance. The multi-pinhole mask 201 may be freely exchanged by the user depending on the mask pattern of a multi-pinhole camera used during image recognition.

Note that such a change of the multi-pinhole mask 201 can be achieved by the following various methods other than the replacement of the multi-pinhole mask 201. For example, the multi-pinhole mask 201 may be rotatably attached in front of the image sensor 202, or may be arbitrarily rotated by the user. Further, for example, the multi-pinhole mask 201 may be created by the user making a hole in an arbitrary place of a plate attached in from of the image sensor 202. The multi-pinhole mask 201 may be a liquid crystal mask using a spatial light modulator or the like. A predetermined number of pinholes may be formed at predetermined positions by arbitrarily setting the transmittance of positions in the multi-pinhole mask 201. Furthermore, for example, the multi-pinhole mask 201 may be formed by using a stretchable material such as rubber. The user may physically deform the multi-pinhole mask 201 to change the positions and the sizes of the pinholes by applying an external force.

Note that the multi-pinhole camera 200 is also used for image recognition using a trained machine learning model. The images captured by the multi-pinhole camera 200 are collected as training data. The collected training data is used for training the machine learning model.

Although in FIG. 2, the two pinholes 2011 and 2012 are arranged side by side in a horizontal direction, the present disclosure is not particularly limited thereto, and the multi-pinhole camera 200 may include three or more pinholes. In addition, the two pinholes 2011 and 2012 may be arranged in a vertical direction.

The moving device 3 is a driving device such as a motor. The moving device 3 is, for example, a rail having a linear motor, and is loaded with the imaging device 5. The moving device 3 drives the linear motor to move the imaging device 5. The position of the display device 4 is fixed. The moving device 3 moves the imaging device 5 in a direction approaching the display device 4 or in a direction away from the display device 4. At this time, the moving device 3 moves the imaging device 5 in the optical axis direction of the imaging device 5. As a result, as described later, the imaging device 5 can acquire an image in which the positions of the pinhole images corresponding to the pinholes present on the optical axis of the imaging device 5 are fixed. The moving device 3 may be, surely, able to merely move the imaging device 5, and may be, for example, a motor that moves wheels or a flight vehicle such as a drone.

Specifically, the imaging control device 2 includes a microprocessor, a random access memory (RAM), a read only memory (ROM), a hard disk, and the like, not illustrated. The RAM, the ROM, or the hard disk stores a computer program, and the microprocessor operates in accordance with the computer program to implement functions of the imaging control device 2.

The imaging control device 2 includes a first storage part 21, a second storage part 22, a third storage part 23, a distance acquiring part 24, a movement directing part 25, an image acquiring part 26, a display control part 27, an imaging control part 28, and a storage control part 29.

The first storage part 21 stores a first training image of the machine learning model and correct answer information associated with the first training image. The first storage part 21 stores a plurality of first training images captured by a normal camera and correct answer information (annotation information) associated with each of the plurality of first training images. The first training image is an image including a subject that is a recognition target of the machine learning model. The first training image is an image without blurring acquired by another imaging device different from the imaging device 5.

The correct answer information is different for each identification task. For example, when the identification task is object detection, the correct answer information is a bounding box representing a region occupied by the detection target on the image. In addition, for example, when the identification task is object identification, the correct answer information is a classification result. Further, for example, when the identification task is a region division on an image, the correct answer information is classification information on each pixel. The first training images and the correct answer information stored in the first storage part 21 are the same as the information used in the machine learning of the identifier using a normal camera.

The third storage part 23 stores the distance between the display device 4 and the imaging device 5 and the display size of the first training image to be displayed on the display device 4 in association with each other. The third storage part 23 stores the plurality of distances and the display sizes depending on the plurality of distances in association with each other. For example, the plurality of distances may include a first distance between which the display device 4 and the imaging device 5 are closest, a second distance longer than the first distance, and a third distance longer than the second distance. The first distance may be, for example, one meter, the second distance may be, for example, two meters, and the third distance may be, for example, three meters.

The distance acquiring part 24 acquires the distance between the display device 4 and the imaging device 5. When the distance between the display device 4 and the imaging device 5 is changed, the distance acquiring part 24 acquires the distance between the display device 4 and the imaging device 5 from the third storage part 23. The distance acquiring part 24 acquires one of a plurality of distances between the display device 4 and the imaging device 5 stored in the third storage part 23. The distance acquiring part 24 outputs the acquired distance to the movement directing part 25.

For example, in a case where the third storage part 23 stores the first distance, the second distance, and the third distance (first distance<second distance<third distance), the distance acquiring part 24 first acquires the third distance from the third storage part 23 and outputs the third distance to the movement directing part 25. Then, when the imaging of the first training image at the third distance is completed, the distance acquiring part 24 acquires the second distance from the third storage part 23 and outputs the second distance to the movement directing part 25. Then, when the imaging of the first training image at the second distance is completed, the distance acquiring part 24 acquires the first distance from the third storage part 23 and outputs the first distance to the movement directing part 25.

The movement directing part 25 directs a change of the distance between the display device 4 and the imaging device 5. The movement directing part 25 directs the moving device 3 to move the imaging device 5 depending on the distance between the display device 4 and the imaging device 5 acquired by the distance acquiring part 24. A reference position of the imaging device 5 is determined in advance. For example, in a case where the third distance is acquired by the distance acquiring part 24, the movement directing part 25 directs the moving device 3 to move the imaging device 5 to the reference position associated with the third distance. Then, in a case where the second distance is acquired by the distance acquiring part 24, the movement directing part 25 directs the moving device 3 to move the imaging device 5 from the reference position by a difference between the third distance and the second distance. Further, the movement directing part 25 directs a change of the distance between the display device 4 and the imaging device 5 more than once.

The moving device 3 moves the imaging device 5 based on a direction from the movement directing part 25.

The image acquiring part 26 acquires the first training image from the first storage part 21. The image acquiring part 26 outputs the first training image acquired from the first storage part 21 to the display control part 27.

The display control part 27 causes the display device 4 to display the first training image based on the distance between the display device 4 and the imaging device 5. When the distance between the display device 4 and the imaging device 5 is changed, the display control part 27 changes the display size of the first training image so that the size of the second training image acquired by the imaging device 5 is maintained, and causes the display device 4 to display the first training image having the changed display size. The display control part 27 changes the display size of the first training image in proportion to the distance between the display device 4 and the imaging device 5. The display size depending on the distance between the display device 4 and the imaging device 5 is stored in advance in the third storage part 23. Therefore, the display control part 27 acquires the display size depending on the distance between the display device 4 and the imaging device 5 from the third storage part 23, and changes the display size of the first training image to the acquired display size.

In addition, every time the movement directing part 25 changes the distance more than once, the display control part 27 changes the display size of the first training image so that the size of the second training image acquired by the imaging device 5 is maintained, and causes the display device 4 to display the first training image having the changed display size.

The imaging control part 28 causes the imaging device 5 to capture the first training image displayed on the display device 4, and acquires the second training image. When the distance between the display device 4 and the imaging device 5 is changed, the imaging control part 28 causes the imaging device 5 to capture the first training image. The imaging control part 28 outputs the acquired second training image to the storage control part 29. In addition, the imaging control part 28 causes the imaging device 5 to capture the first training image and acquires a plurality of second training images every time the distance is changed more than once by the movement directing part 25.

The storage control part 29 acquires correct answer information associated with the first training image from the first storage part 21, and stores a data set including a set of the second training image obtained by the imaging device 5 and the correct answer information associated with the first training image in the second storage part 22. The storage control part 29 stores a data set including a set of the second training image acquired by the imaging device 5 and the correct answer information acquired from the first storage part 21 in the second storage part 22. Further, the storage control part 29 stores a data set including a set of each of the plurality of the second training images acquired by the imaging device 5 and the correct answer information in the second storage part 22.

The second storage part 22 stores the data set including the set of the second training image and the correct answer information.

Data set creation processing in the imaging control device 2 according to the first embodiment of the present disclosure will be described below.

Figure 3:
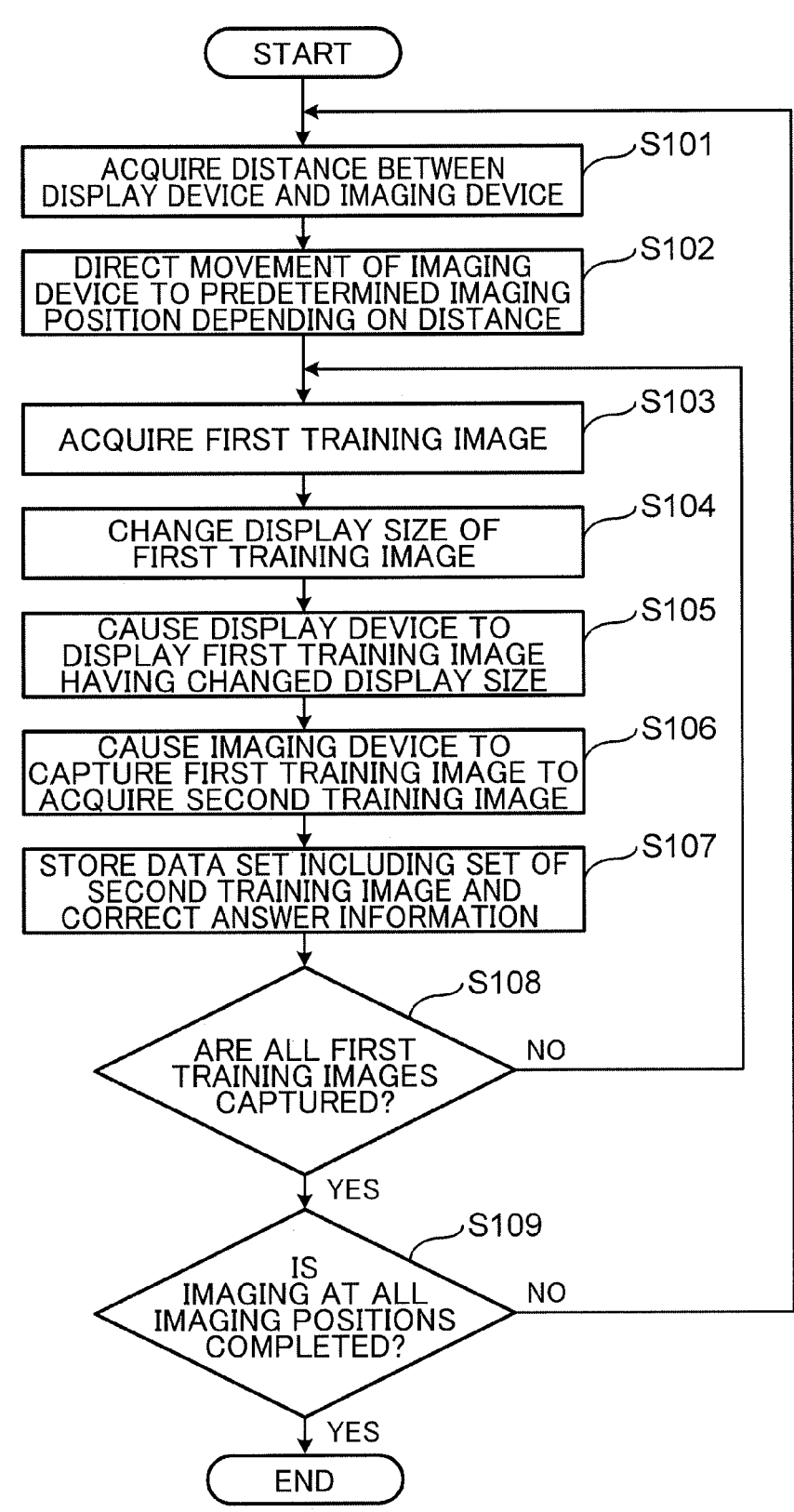
FIG. 3 is a flowchart for describing data set creation processing in an imaging control device according to the first embodiment of the present disclosure.

FIG. 3 is a flowchart for describing the data set creation processing in the imaging control device 2 according to the first embodiment of the present disclosure.

First, the distance acquiring part 24 acquires a distance between the display device 4 and the imaging device 5 in order to change the distance between the display device 4 and the imaging device 5 (step S101). The distance acquiring part 24 outputs the acquired distance to the movement directing part 25.

The movement directing part 25 directs the moving device 3 to move the imaging device 5 to a predetermined imaging position depending on the distance acquired by the distance acquiring part 24 (step S102). Here, the imaging position is a position where the imaging device 5 captures the first training image, the position being set in advance to change the distance between the imaging device 5 and the display device 4. Upon receiving the direction from the movement directing part 25, the moving device 3 moves the imaging device 5 to the predetermined imaging position.

The image acquiring part 26 acquires the first training image from the first storage part 21 (step S103). The image acquiring part 26 acquires a first training image that is not captured from among the plurality of first training images stored in the first storage part 21.

When the distance between the display device 4 and the imaging device 5 is changed, the display control part 27 changes the display size of the first training image so that the size of the second training image acquired by the imaging device 5 is maintained (step S104). At this time, the display control part 27 acquires a display size depending on the distance between the display device 4 and the imaging device 5 from the third storage part 23, and changes the display size of the first training image to the acquired display size.

The display control part 27 then causes the display device 4 to display the first training image having changed display size (step S105).

The display control part 27 changes the display size of the first training image depending on the distance between the display device 4 and the imaging device 5.

Here, the change of the display size of the first training image by the display control part 27 will be described.

Figure 4:
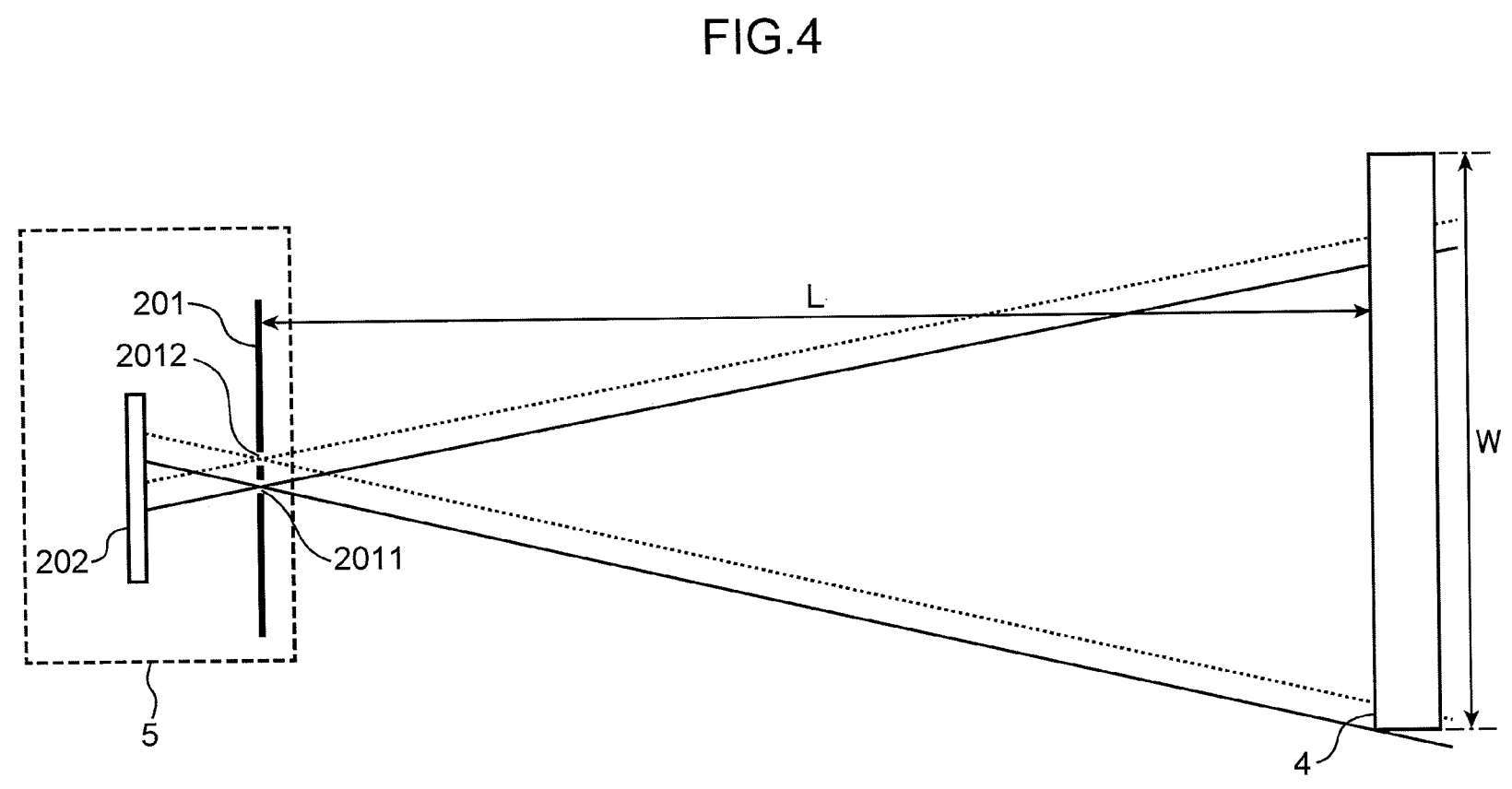

FIG. 4 is a schematic view for describing a positional relationship between the display device 4 and the imaging device 5 in the first embodiment. FIG. 4 is a top view of the display device 4 and the imaging device 5. Here, a distance L is a distance between the multi-pinhole mask 201 of the imaging device 5 and a display screen of the display device 4, and a display size W is the display size of the first training image to be displayed on the display device 4. Furthermore, the imaging device 5 has the same configuration as the lensless multi-pinhole camera 200 illustrated in FIG. 2. A pinhole 2011 exists on the optical axis of the imaging device 5, and a pinhole 2012 exists adjacent to the pinhole 2011.

The display size is W1 when the distance between the imaging device 5 and the display device 4 is L1, and the display size is W2 when the distance between the imaging device 5 and the display device 4 is L2. At this time, the display control part 27 determines the display size of the first training image to be displayed on the display device 4 so that the following relationship is satisfied. As a result, regardless of the change of the distance between the imaging device 5 and the display device 4, the first training image from which the second training image with the same size is acquired is displayed on the display device 4.

$$L1:W1=L2:W2$$

That is, the display size is determined so that the distance between the imaging device 5 and the display device 4 is proportional to the display size of the first training image to be displayed on the display device 4. As a result, the size and the position of the image captured through the pinhole 2011 on the optical axis by the imaging device 5 are constant without depending on the distance L between the imaging device 5 and the display device 4. On the other hand, an imaging range of the image captured through the pinhole 2012 not on the optical axis by the imaging device 5 changes depending on the distance L between the imaging device 5 and the display device 4. That is, the pinholes 2011 and 2012 generate a different parallax depending on the distance L between the imaging device 5 and the display device 4. Parallax information includes depth information.

Figure 5:
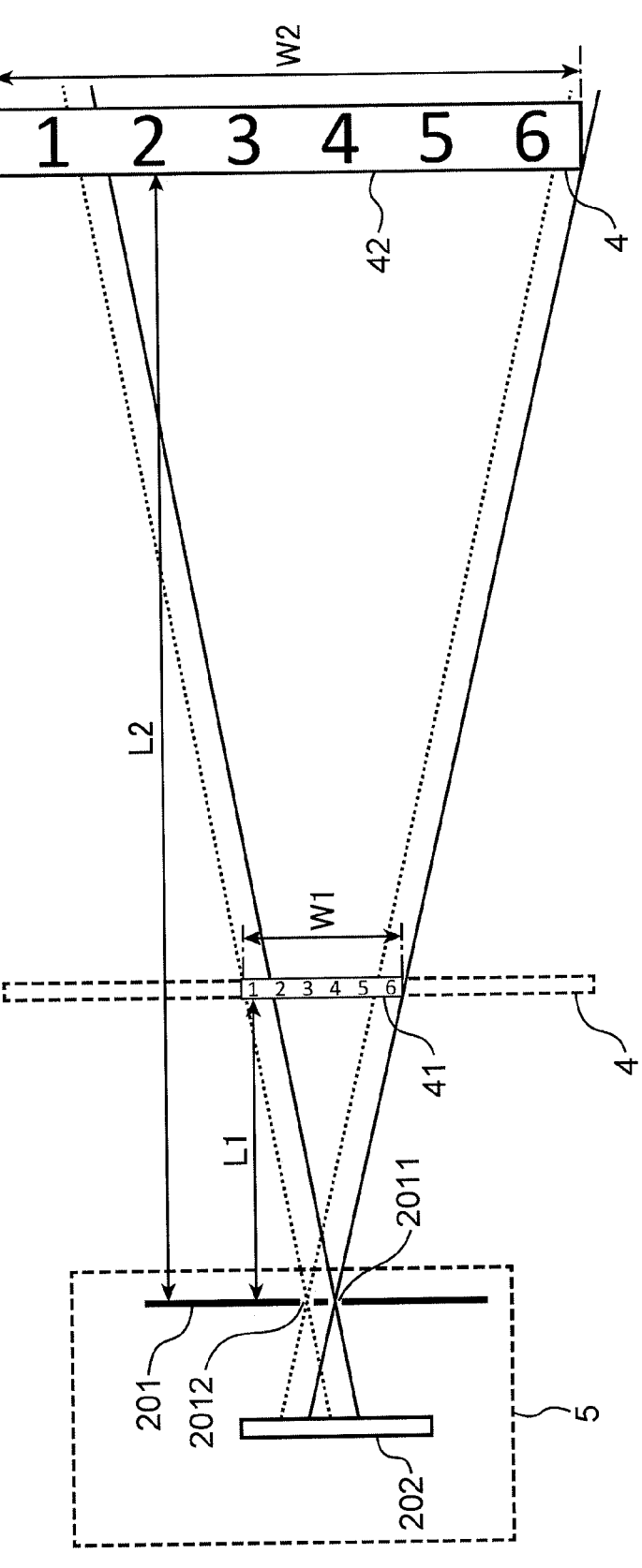
FIG. 5 is a schematic view for describing an image captured through two pinholes in the multi-pinhole camera.
Figure 6:
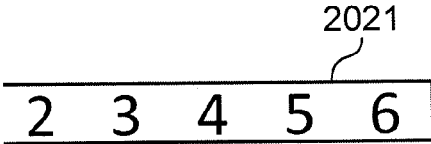
FIG. 6 is a diagram illustrating an example of an image captured by the imaging device in a case where a distance between the imaging device and the display device is L1.
Figure 7:
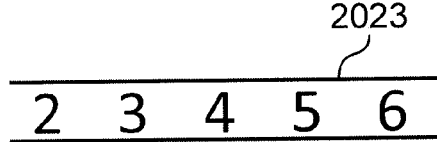
FIG. 7 is a diagram illustrating an example of an image captured by the imaging device in a case where the distance between the imaging device and the display device is L2 (L1<L2).
Figure 7:
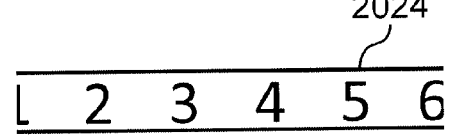

FIG. 5 is a schematic view for describing an image captured by passing through the two pinholes in the multi-pinhole camera. FIG. 6 illustrates an example of an image captured by the imaging device 5 in the case where the distance between the imaging device 5 and the display device 4 is L1. FIG. 7 illustrates an example of an image captured by the imaging device 5 in the case where the distance between the imaging device 5 and the display device 4 is L2 (L1<L2). FIG. 5 is a top view of the display device 4 and the imaging device 5.

In FIG. 5, the same components as those in FIG. 4 are denoted by the same reference numerals, and description thereof is omitted. In FIG. 5, the display device 4 displays a first training image in which numbers "123456" are arranged in the horizontal direction. As described above, the display size of a first training image 41 is W1 when the distance between the imaging device 5 and the display device 4 is L1, and the display size of a first training image 42 is W2 when the distance between the imaging device 5 and the display device 4 is L2. The distance L1 is shorter than the distance L2, and the display size W1 is smaller than the display size W2. Note that the display sizes W1 and W2 represent the horizontal widths of the first training images 41 and 42, respectively. An aspect ratio between the first training images 41 and 42 is determined in advance, and is, for example, 3:2, 4:3, or 16:9. The display size is changed in a state where the aspect ratio between the first training images 41 and 42 is maintained.

The display size of the first training image is greater as the distance between the imaging device 5 and the display device 4 is longer, and the display size of the first training image is smaller as the distance between the imaging device 5 and the display device 4 is shorter.

In FIG. 6, an image 2021 represents an image captured through the pinhole 2011 on the optical axis when the distance between imaging device 5 and display device 4 is L1. An image 2022 represents an image captured through the pinhole 2012 not on the optical axis when the distance between imaging device 5 and display device 4 is L1. Further, In FIG. 7, an image 2023 represents an image captured through the pinhole 2011 on the optical axis when the distance between imaging device 5 and display device 4 is L2. An image 2024 represents an image captured through the pinhole 2012 not on the optical axis when the distance between imaging device 5 and display device 4 is L2.

As illustrated in FIGS. 6 and 7, the positions and the sizes of the images 2021 and 2023 captured through the pinhole 2011 on the optical axis do not change irrespective of the distance between the imaging device 5 and the display device 4. In this manner, the display sizes and the positions of the first training images 41 and 42 to be displayed on the display device 4 are adjusted, and thus the sizes of images captured through the pinhole 2011 in the multi-pinhole camera are kept constant.

On the other hand, as illustrated in FIGS. 6 and 7, the sizes of the images 2022 and 2024 captured through the pinhole 2012 not on the optical axis do not change, but the imaging ranges of the images 2022 and 2024 change. A parallax depending on the distance occurs between the images 2022, 2024 and the left images 2021, 2023. Here, the parallax is a shift amount of a plurality of images on an image. Therefore, it can be seen that the parallax information includes information about the distance between a subject and the imaging device 5.

The display control part 27 changes the display size of the first training image to be displayed on the display device 4 when the distance between the imaging device 5 and the display device 4 is changed. At this time, the display control part 27 changes the display size of the first training image so that the size of the subject image on the second training image does not change even if the distance between the imaging device 5 and the display device 4 is changed. This yields the second training image on which the plurality of subject images is superimposed with a shift amount depending on the distance between the imaging device 5 and the display device 4.

The parallax depending on the distance in the multi-pinhole camera will be described with reference to FIGS. 8 to 10.

Figures 8, 9:
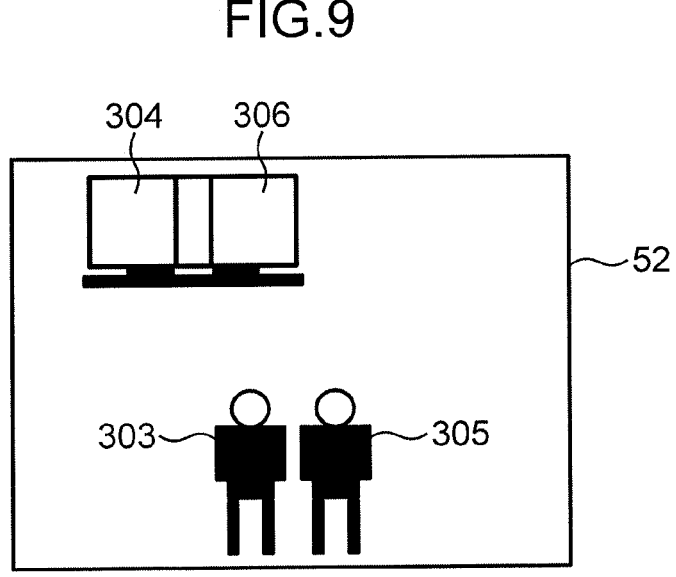
FIG. 8 is a diagram illustrating an example of a first training image displayed on the display device.
FIG. 9 is a diagram illustrating an example of a second training image acquired by causing the imaging device to capture the first training image illustrated in FIG. 8 in a case where the distance between the imaging device and the display device is L1.

FIG. 8 is a diagram illustrating an example of a first training image displayed on the display device 4. FIG. 9 is a diagram illustrating an example of a second training image acquired by the imaging device 5 capturing the first training image illustrated in FIG. 8 in the case where the distance between the imaging device 5 and the display device 4 is L1. FIG. 10 is a diagram illustrating an example of a second training image acquired by the imaging device 5 capturing the first training image illustrated in FIG. 8 in the case where the distance between the imaging device 5 and the display device 4 is L2 (L1<L2).

A person 301 and a television 302 are seen in the first training image 51 illustrated in FIG. 8. A second training image 52 illustrated in FIG. 9 is acquired by the imaging device 5 with the two pinholes 2011 and 2012 capturing the first training image 51 illustrated in FIG. 8 in the case where the distance between the imaging device 5 and the display device 4 is L1. Further, a second training image 53 illustrated in FIG. 10 is acquired by the imaging device 5 with the two pinholes 2011 and 2012 capturing the first training image 51 illustrated in FIG. 8 in the case where the distance between the imaging device 5 and the display device 4 is L2. L1 is shorter than L2.

In the second training image 52 illustrated in FIG. 9, a person 303 is the person 301 on the first training image 51 captured through the pinhole 2011 on the optical axis, and a television 304 is the television 302 on the first training image 51 captured through the pinhole 2011 on the optical axis. A person 305 is the person 301 on the first training image 51 captured through the pinhole 2012 not on the optical axis, and a television 306 is the television 302 on the first training image 51 captured through the pinhole 2012 not on the optical axis.

Figure 10:
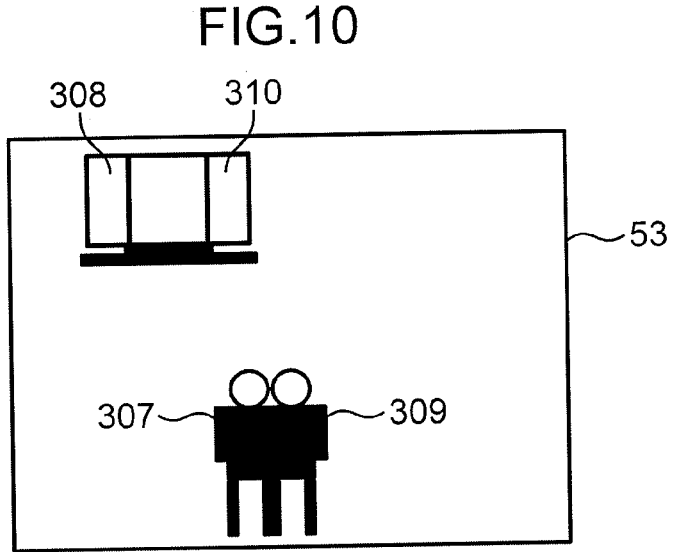
FIG. 10 is a diagram illustrating an example of a second training image acquired by causing the imaging device to capture the first training image illustrated in FIG. 8 in the case where the distance between the imaging device and the display device is L2 (L1<L2).

Further, in the second training image 53 illustrated in FIG. 10, a person 307 is the person 301 on the first training image 51 captured through the pinhole 2011 on the optical axis, and a television 308 is the television 302 on the first training image 51 captured through the pinhole 2011 on the optical axis. A person 309 is the person 301 on the first training image 51 captured through the pinhole 2012 not on the optical axis, and a television 310 is the television 302 on the first training image 51 captured through the pinhole 2012 not on the optical axis.

As described above, the second training image acquired from the imaging device 5 that is the multi-pinhole camera is an image on which a plurality of subject images is superimposed. The positions and the sizes of the persons 303 and 307 and the televisions 304 and 308 imaged through the pinhole 2011 on the optical axis do not change on the captured image. On the other hand, the positions of the persons 305 and 309 and the televisions 306 and 310 imaged through the pinhole 2012 not on the optical axis change on the captured image, and the parallax amount is lower as the distance between the subject and the imaging device 5 is longer. That is, the first training image is captured while the distance L between the imaging device 5 and the display device 4 is changed, thereby acquiring the second training image where the parallax amount is changed.

In the first embodiment, the imaging device 5 does not have a lens, but the imaging device 5 may have an optical system such as a lens between the imaging device 5 and the display device 4. Since the imaging device 5 includes the lens, the distance (optical path length) between the imaging device 5 and the display device 4 can be made longer or shorter than the actual distance. This can generate a greater parallax or a smaller parallax than in the case where the optical system is not inserted. In a case where the moving device 3 cannot greatly change the distance between the imaging device 5 and the display device 4, a configuration where the imaging device 5 includes an optical system is effective. Further, in the case where the optical system is inserted between the imaging device 5 and the display device 4, the moving device 3 may change a focal length of the optical system, insert the optical system, or remove the optical system, instead of physically moving the imaging device 5 or the display device 4, to change the distance between the imaging device 5 and the display device 4.

Note that the distance L may be the above-described optical path length instead of an actually measured distance. The display control part 27 may determine the display size of the first training image to be displayed on the display device 4 based on the optical path length between the imaging device 5 and the display device 4.

Returning to FIG. 3, the imaging control part 28 causes the imaging device 5 to capture the first training image displayed on the display device 4 to acquire the second training image (step S106). The imaging device 5 performs imaging so that the display device 4 enters the visual field. As described above, the display size of the first training image is changed depending on the distance between the display device 4 and the imaging device 5, thereby making it possible to acquire the second training images having identical imaging size even if the distance between the display device 4 and the imaging device 5 is changed.

Next, the storage control part 29 acquires correct answer information associated with the first training image displayed on the display device 4 from the first storage part 21, and stores a data set including a set of the second training image acquired by the imaging device 5 and the correct answer information associated with the first training image displayed on the display device 4 in the second storage part 22 (step S107). As a result, the second storage part 22 stores the data set including the set of the second training image acquired by the imaging device 5 and the correct answer information thereof.

The image acquiring part 26 determines whether the imaging device 5 has captured all the first training images stored in the first storage part 21 (step S108). Here, in a case where a determination is made that the imaging device 5 has not captured all the first training images (NO in step S108), the processing returns to step S103, and the image acquiring part 26 newly acquires a first training image that has not been captured from among the plurality of first training images stored in the first storage part 21. Thereafter, the processing from steps S104 to S106 is executed by using the newly acquired first training image. Thereafter, in step S107, a data set including a set of the second training image acquired by the imaging device 5 and the correct answer information associated with the new first training image displayed on the display device 4 is stored in the second storage part 22, and then step S108 is executed.

On the other hand, in a case where the determination is made that the imaging device 5 has captured all the first training images (YES in step S108), the distance acquiring part 24 determines whether the imaging device 5 has completed the imaging at all preset imaging positions (step S109). Here, in a case where a determination is made that the imaging device 5 has not completed be completed the imaging on all the imaging positions (NO in step S109), the processing returns to step S101, and the distance acquiring part 24 acquires a distance between the display device 4 and the imaging device 5 corresponding to an imaging position where the imaging has not been performed from among the plurality of imaging positions stored in the third storage part 23. The movement directing part 25 directs the moving device 3 to move the imaging device 5 to a predetermined imaging position depending on the distance acquired by the distance acquiring part 24. The moving device 3 moves the imaging device 5 to the predetermined imaging position in accordance with the direction from the movement directing part 25.

In contrast, in a case where the determination is made that the imaging device 5 has completed the imaging on all the imaging positions (YES in step S109), the processing ends.

In the example illustrated in FIG. 3, the storage control part 29 acquires the correct answer information associated with the first training image displayed on the display device 4 from the first storage part 21, but the present disclosure is not limited thereto.

For example, the image acquiring part 26 may acquire the first training image and the correct answer information associated with the first training image from the first storage part 21. In this case, the image acquiring part 26 outputs the correct answer information acquired from the first storage part 21 to the storage control part 29, and the storage control part 29 stores, in the second storage part 22, a data set including a set of the second training image acquired by the imaging device 5 and the correct answer information associated with the first training image displayed on the display device 4, that is, the correct answer information output from the image acquiring part 26.

As described above, in the imaging system 1 of the first embodiment, the display size of the first training image to be displayed on the display device 4 is changed depending on the distance between the imaging device 5 and the display device 4. As a result, the position and the size of the subject image captured through the pinhole on the optical axis do not change, but an image in which the amount of the parallax between the pinholes in the multi-pinhole camera is changed is captured. Since the position and the size of the subject image captured through the pinhole on the optical axis do not change, the correct answer information given to the first training image displayed on the display device 4 can be used as it is. This makes it possible to create a data set appropriate to the multi-pinhole camera. Execution of the training processing by machine learning using such a data set achieves highly accurate recognition without depending on the distance to the subject.

In the above description, the movement directing part 25 moves the imaging device 5 in the optical axis direction of the imaging device 5, but may move the imaging device 5 in a direction intersecting the optical axis direction of the imaging device 5. In a case where a lensless camera or the like is used as the imaging device 5, a phenomenon, referred to as a vignetting, occurs. This phenomenon is such that the light amount attenuates from the vicinity of the center toward the outer edge portion of the image sensor 202. The second training image is affected by the vignetting. In response to this, the movement directing part 25 moves the imaging device 5 in the direction intersecting the optical axis direction to changes the positional relationship between the imaging device 5 and the display device 4, thereby obtaining a plurality of second training images affected by different vignetting for each subject.

Furthermore, the movement directing part 25 may move the display device 4 instead of the imaging device 5. For example, in a case where the display device 4 is a display and the moving device 3 is a rail having a linear motor, the moving device 3 may be loaded with the display that is the display device 4 and may drive the linear motor to move the display device 4. Further, for example, in a case where the display device 4 is a projector and a screen, the moving device 3 may move at least one of the screen and the projector, or may change the distance between the screen and the projector. In addition, the display control part 27 may change the size of the first training image projected by the projector.

Here, a modification of the first embodiment where the display device 4 is moved instead of the imaging device 5 will be described.

Figure 11:
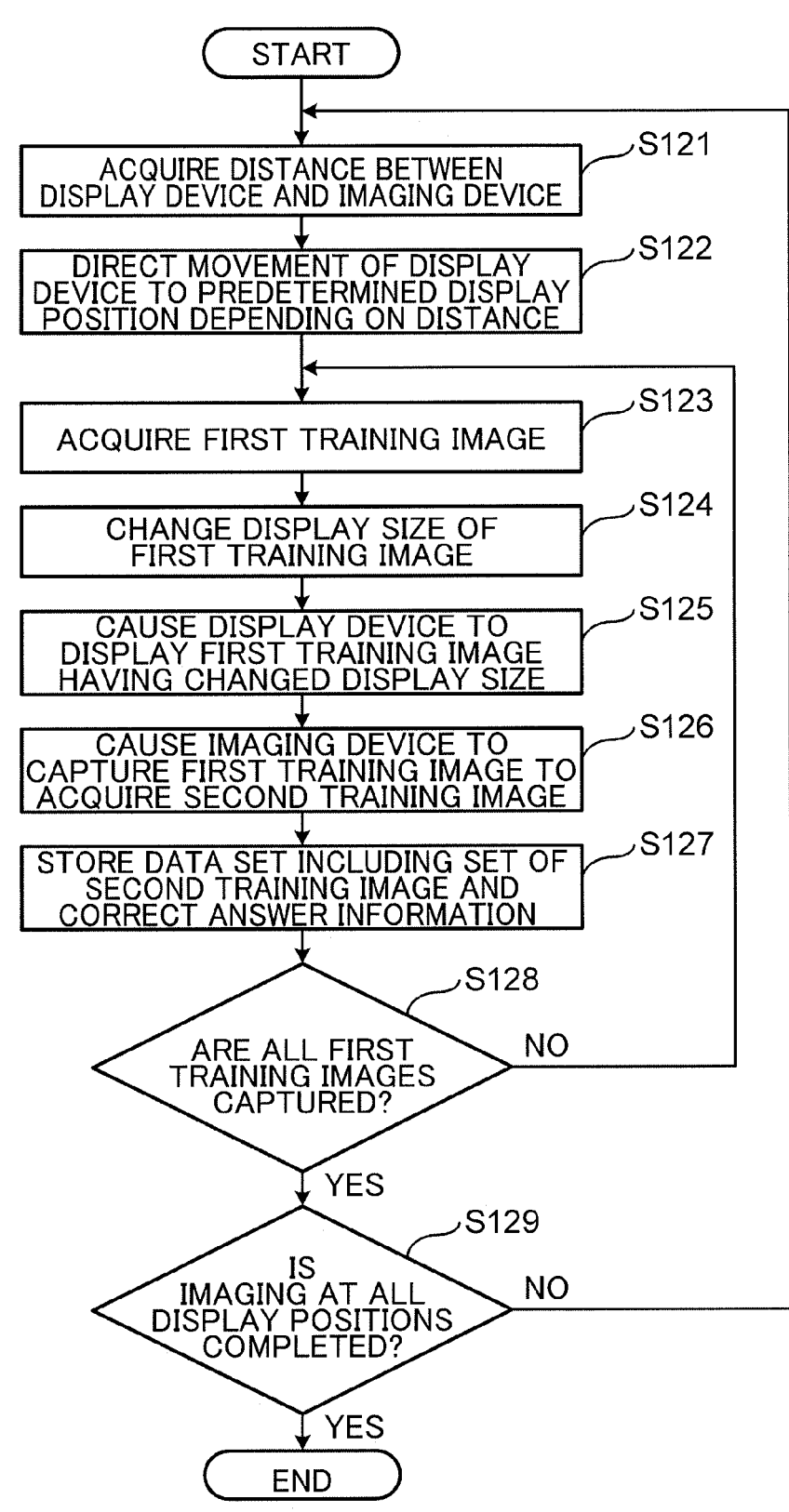
FIG. 11 is a flowchart for describing data set creation processing in an imaging control device according to a modification of the first embodiment of the present disclosure.

FIG. 11 is a flowchart for describing the data set creation processing in an imaging control device 2 according to the modification of the first embodiment of the present disclosure.

In the modification of the first embodiment, the movement directing part 25 directs the moving device 3 to move the display device 4 depending on the distance between the display device 4 and the imaging device 5 acquired by the distance acquiring part 24. A reference position of the display device 4 is determined in advance. For example, in a case where the third distance is acquired by the distance acquiring part 24, the movement directing part 25 directs the moving device 3 to move the display device 4 to the reference position corresponding to the third distance. Then, in a case where the second distance is acquired by the distance acquiring part 24, the movement directing part 25 directs the moving device 3 to move the display device 4 from the reference position by the difference between the third distance and the second distance.

The moving device 3 moves the display device 4 in accordance with a direction from the movement directing part 25.

Processing in step S121 illustrated in FIG. 11 is the same as the processing in step S101 illustrated in FIG. 3, and thus description thereof will be omitted.

The movement directing part 25 directs the moving device 3 to move the display device 4 to a predetermined display position depending on the distance acquired by the distance acquiring part 24 (step S122). Upon receiving the direction from the movement directing part 25, the moving device 3 moves the display device 4 to the predetermined display position.

Processing in steps S123 to S128 illustrated in FIG. 11 is the same as the processing in steps S103 to S108 illustrated in FIG. 3, and thus will not be described.

In a case where the determination is made that the imaging device 5 has captured all the first training images (YES in step S128), the distance acquiring part 24 determines whether the imaging device 5 has completed the imaging at all preset display positions (step S129). Here, the display position is a position where the display device 4 displays the first training image, the position being set in advance to change the distance between the imaging device 5 and the display device 4. Here, in a case where the determination is made that the imaging device 5 has not completed the imaging at all the display positions (NO in step S129), the processing returns to step S121, and the distance acquiring part 24 acquires a distance between the display device 4 and the imaging device 5 corresponding to a display position where the imaging has not been performed from among the plurality of imaging positions stored in the third storage part 23. The movement directing part 25 directs the moving device 3 to move the display device 4 to a predetermined display position depending on the distance acquired by the distance acquiring part 24. The moving device 3 moves the display device 4 to the predetermined display position in accordance with the direction from the movement directing part 25.

In contrast, in a case where the determination is made that the imaging device 5 has completed the imaging at all the display positions (YES in step S129), the processing ends.

In the first embodiment, the moving device 3 moves the imaging device 5 or the display device 4, but the present disclosure is not particularly limited thereto, and the moving device 3 may move both the imaging device 5 and the display device 4.

Second Embodiment

In the first embodiment described above, a plurality of distances between the display device 4 and the imaging device 5 is determined in advance, and at least one of the display device 4 and the imaging device 5 is moved to positions corresponding to the plurality of predetermined distances. Further, the display size of the first training image to be displayed on the display device 4 is changed depending on each distance between the imaging device 5 and the display device 4. In contrast, in the second embodiment, at least one of the display device 4 and the imaging device 5 is moved to an arbitrary position, the distance between the imaging device 5 and the display device 4 is measured, and the display size of the first training image to be displayed on the display device 4 is changed depending on the measured distance.

Figure 12:
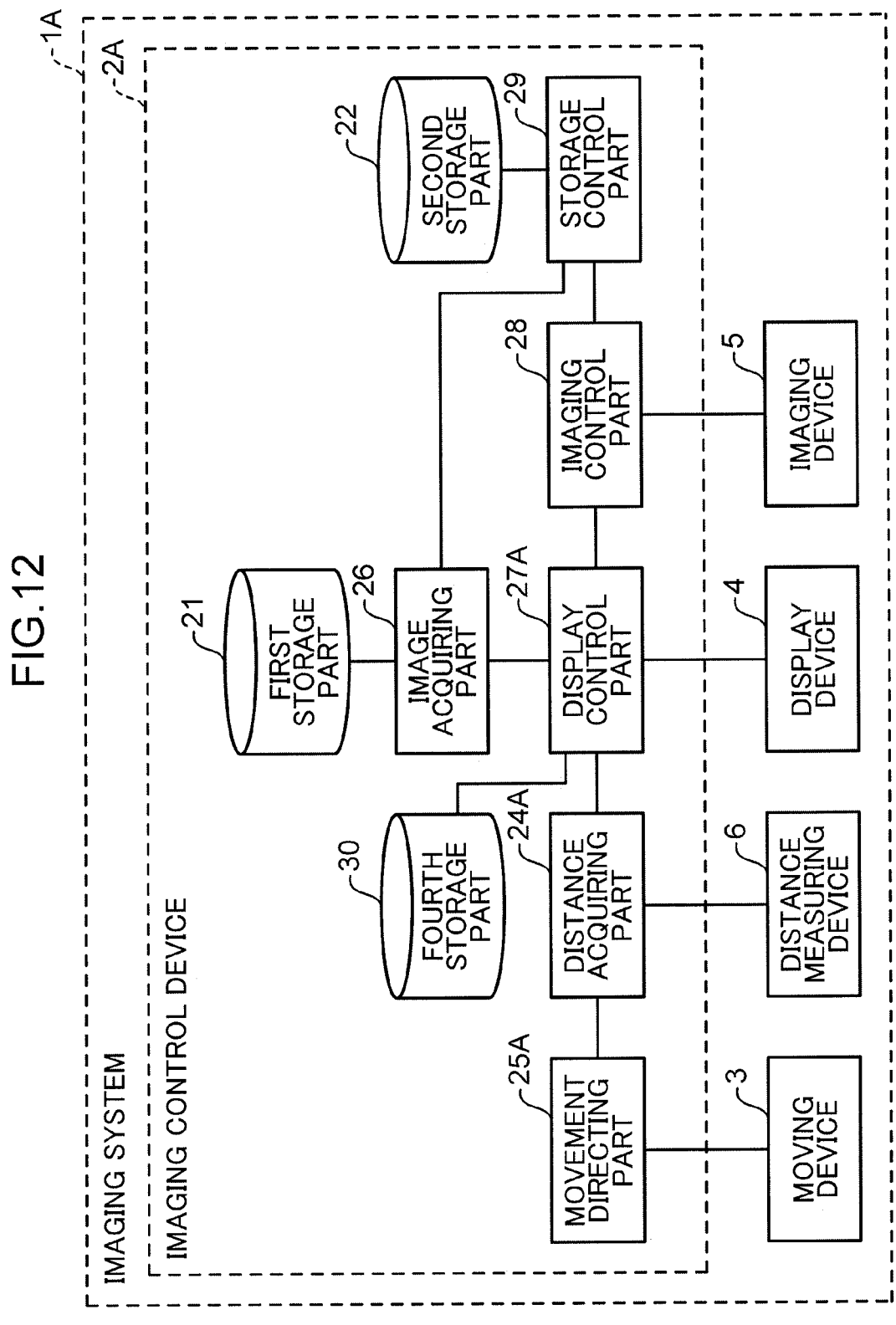
FIG. 12 is a block diagram illustrating an example of an overall configuration of an imaging system according to a second embodiment of the present disclosure.

FIG. 12 is a block diagram illustrating an example of an overall configuration of an imaging system 1A according to the second embodiment of the present disclosure. In FIG. 12, the same components as those in FIG. 1 are denoted by the same reference numerals, and description thereof is omitted.

The imaging system 1A includes an imaging control device 2A, the moving device 3, the display device 4, the imaging device 5, and a distance measuring device 6.

The distance measuring device 6 is, for example, a laser range finder or a Time of Flight (ToF) camera, and measures the distance between the display device 4 and the imaging device 5 in accordance with a direction from the imaging control device 2A. For example, the display device 4 and the imaging device 5 are placed on a rail. At least one of the display device 4 and the imaging device 5 is movable on the rail in the optical axis direction of the imaging device 5. The imaging control device 2A includes the first storage part 21, the second storage part 22, a distance acquiring part 24A, a movement directing part 25A, the image acquiring part 26, a display control part 27A, the imaging control part 28, the storage control part 29, and a fourth storage part 30.

The movement directing part 25A directs a change of the distance between the display device 4 and the imaging device 5. The movement directing part 25A receives an input operation for moving the imaging device 5 by a user and directs the moving device 3 to move the imaging device 5 in response to the accepted input operation. The movement directing part 25A receives input operations for moving the imaging device 5 closer to the display device 4 or separating the imaging device 5 from the display device 4.

In the second embodiment, the movement directing part 25A moves the imaging device 5 in the optical axis direction of the imaging device 5, but may move the imaging device 5 in a direction intersecting the optical axis direction of the imaging device 5. The movement directing part 25A may move the display device 4 instead of the imaging device 5. Further, the movement directing part 25A may move both the imaging device 5 and the display device 4.

The imaging system 1A may not include the moving device 3, and the imaging control device 2A may not include the movement directing part 25A. In this case, the user may manually change the distance between the display device 4 and the imaging device 5. For example, the user may move at least one of the imaging device 5 and the display device 4 placed on the rail.

When the moving device 3 completes the movement of the imaging device 5, the distance acquiring part 24A directs the distance measuring device 6 to measure the distance between the display device 4 and the imaging device 5. The distance acquiring part 24A acquires the distance between the display device 4 and the imaging device 5 measured by the distance measuring device 6. Note that the distance acquiring part 24A may receive the input operation for measuring the distance between the display device 4 and the imaging device 5 from the user, and may cause the distance measuring device 6 to measure the distance in response to the received input operation. In particular, in a case where the user manually moves the imaging device 5, the distance acquiring part 24A may receive a measurement start direction of the distance measuring device 6 from the user.

The fourth storage part 30 stores a reference distance between the display device 4 and the imaging device 5 and a reference display size of the first training image to be displayed on the display device 4 in association with each other. The display size of the first training image is proportional to the distance between the display device 4 and the imaging device 5. Therefore, if the reference distance between the display device 4 and the imaging device 5 and the reference display size of the first training image with respect to the reference distance are determined in advance, the display size is determined from the measured distance.

The display control part 27A causes the display device 4 to display the first training image based on the distance measured by the distance measuring device 6. When the distance between the display device 4 and the imaging device 5 is changed, the display control part 27A changes the display size of the first training image so that the size of the second training image acquired by the imaging device 5 is maintained, and causes the display device 4 to display the first training image having the changed display size.

The display control part 27A changes the display size of the first training image in proportion to the distance between the display device 4 and the imaging device 5. The reference display size depending on the reference distance between the display device 4 and the imaging device 5 is stored in advance in the fourth storage part 30. The reference distance is, for example, a distance in a case where the display device 4 and the imaging device 5 are placed at positions farthest from each other. Therefore, the display control part 27A calculates the display size from the distance measured by the distance measuring device 6 using the reference distance and the reference display size stored in the fourth storage part 30, and changes the display size of the first training image to the calculated display size.

Data set creation processing in the imaging control device 2A according to the second embodiment of the present disclosure will be described below.

Figure 13:
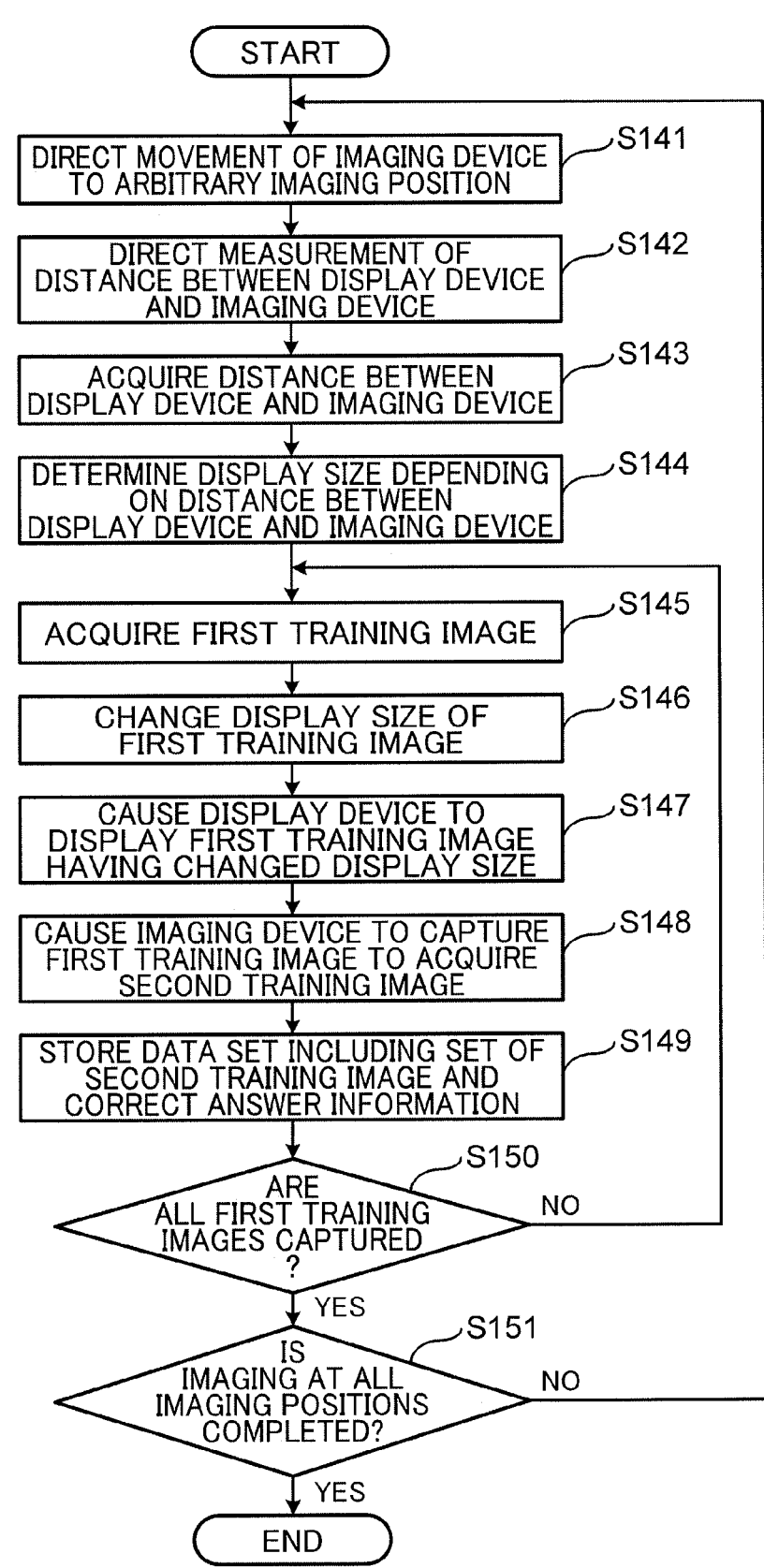
FIG. 13 is a flowchart for describing data set creation processing in an imaging control device according to the second embodiment of the present disclosure.

FIG. 13 is a flowchart for describing the data set creation processing in the imaging control device 2A according to the second embodiment of the present disclosure.

The movement directing part 25A first directs the moving device 3 to move the imaging device 5 to an arbitrary imaging position (step S141). The moving device 3 moves the imaging device 5 to an arbitrary position in accordance with the direction from the movement directing part 25A.

The distance acquiring part 24A then directs the distance measuring device 6 to measure the distance between the display device 4 and the imaging device 5 (step S142). The distance measuring device 6 measures the distance between the display device 4 and the imaging device 5 in accordance with a direction from the distance acquiring part 24A.

The distance acquiring part 24A then acquires, from the distance measuring device 6, the distance between the display device 4 and the imaging device 5 measured by the distance measuring device 6 (step S143).

When the distance between the display device 4 and the imaging device 5 is changed according to the distance measured by the distance measuring device 6, the display control part 27A determines the display size of the first training image in order to maintain the size of the second training image acquired by the imaging device 5 (step S144). The display control part 27A determines the display size of the first training image from the distance measured by the distance measuring device 6 using the reference distance and the reference display size stored in the fourth storage part 30. More specifically, the display control part 27A multiplies a value, which is obtained by dividing the distance measured by the distance measuring device 6 by the reference distance, by the reference display size to calculate the display size of the first training image to be changed.

The fourth storage part 30 may store a table in which the distances between the display device 4 and the imaging device 5 are associated with the display sizes of the first training image. In this case, the display control part 27A may read the display size associated with the distance measured by the distance measuring device 6 from the fourth storage part 30 and determine the read display size as the display size of the first training image.

The image acquiring part 26 acquires the first training image from the first storage part 21 (step S145). The image acquiring part 26 acquires a first training image that is not captured from among the plurality of first training images stored in the first storage part 21.

When the distance between the display device 4 and the imaging device 5 is changed, the display control part 27A changes the display size of the first training image so that the size of the second training image acquired by the imaging device 5 is maintained (step S146). At this time, the display control part 27A changes the display size of the first training image to the determined display size.

The display control part 27A then causes the display device 4 to display the first training image having the changed display size (step S147).

Processing in steps S148 to S149 illustrated in FIG. 11 is the same as the processing in steps S106 to S107 illustrated in FIG. 3, and thus will not be described.

The image acquiring part 26 determines whether the imaging device 5 has captured all the first training images stored in the first storage part 21 (step S150). Here, in a case where a determination is made that the imaging device 5 has not captured all the first training images (NO in step S150), the processing returns to step S145, and the image acquiring part 26 newly acquires a first training image that has not been captured from among the plurality of first training images stored in the first storage part 21. Thereafter, the processing from steps S146 to S148 is executed by using the newly acquired first training image. Thereafter, in step S149, a data set including a set of the second training image acquired by the imaging device 5 and the correct answer information associated with the new first training image displayed on the display device 4 is stored in the second storage part 22, and then step S150 is executed.

On the other hand, in a case where the determination is made that the imaging device 5 has captured all the first training images (YES in step S150), the distance acquiring part 24A determines whether the imaging device 5 has completed the imaging at all planned imaging positions (step S151). Note that a plurality of imaging positions and the number of imaging times are determined in advance. In a case where the imaging position is changed and imaging is performed a predetermined number of times, the distance acquiring part 24A determines that the imaging device 5 has completed the imaging at all the imaging positions. Here, in a case where the determination is made that the imaging device 5 has not completed the imaging at all the imaging positions (NO in step S151), the processing returns to step S141, and the movement directing part 25A directs the moving device 3 to move the imaging device 5 to an arbitrary imaging position. The distance acquiring part 24A directs measurement of the distance between the display device 4 and the imaging device 5 at the imaging position after movement, and acquires the distance measured by the distance measuring device 6.

In contrast, in a case where the determination is made that the imaging device 5 has completed the imaging at all the imaging positions (YES in step S151), the processing ends.

In the example illustrated in FIG. 13, the storage control part 29 acquires the correct answer information associated with the first training image displayed on the display device 4 from the first storage part 21, but the present disclosure is not limited thereto.

As described in the first embodiment, the image acquiring part 26 may acquire the first training image and the correct answer information associated with the first training image from the first storage part 21. In this case, the image acquiring part 26 outputs the correct answer information acquired from the first storage part 21 to the storage control part 29, and the storage control part 29 stores, in the second storage part 22, a data set including a set of the second training image acquired by the imaging device 5 and the correct answer information associated with the first training image displayed on the display device 4, that is, the correct answer information output from the image acquiring part 26.

As described above, in the imaging system 1A of the second embodiment, the display size of the first training image to be displayed on the display device 4 is changed depending on the distance between the imaging device 5 and the display device 4. As a result, the position and the size of the subject image captured through the pinhole on the optical axis do not change, but an image in which the parallax amount between the pinholes in the multi-pinhole camera is changed is captured. Since the position and the size of the subject image captured through the pinhole on the optical axis do not change, the correct answer information given to the first training image displayed on the display device 4 can be used as it is. This makes it possible to create a data set appropriate to the multi-pinhole camera. Execution of the training processing by machine learning using such a data set achieves highly accurate recognition without depending on the distance to the subject.

In addition, the imaging system 1A may not include the moving device 3, and the user may manually move at least one of the imaging device 5 and the display device 4. In this case, the distance measuring device 6 measures the distance between the display device 4 and the imaging device 5 in accordance with a direction from the distance acquiring part 24A. This enables simplification of the configuration of the imaging system 1A, and a reduction in the manufacturing cost of the imaging system 1A.

Third Embodiment

In the first embodiment and the second embodiment, the data set including the set of the second training image and the correct answer information is stored in the second storage part, but in a third embodiment, the machine learning model is trained by using the data set including the set of the second training image and the correct answer information stored in the second storage part.

Figure 14:
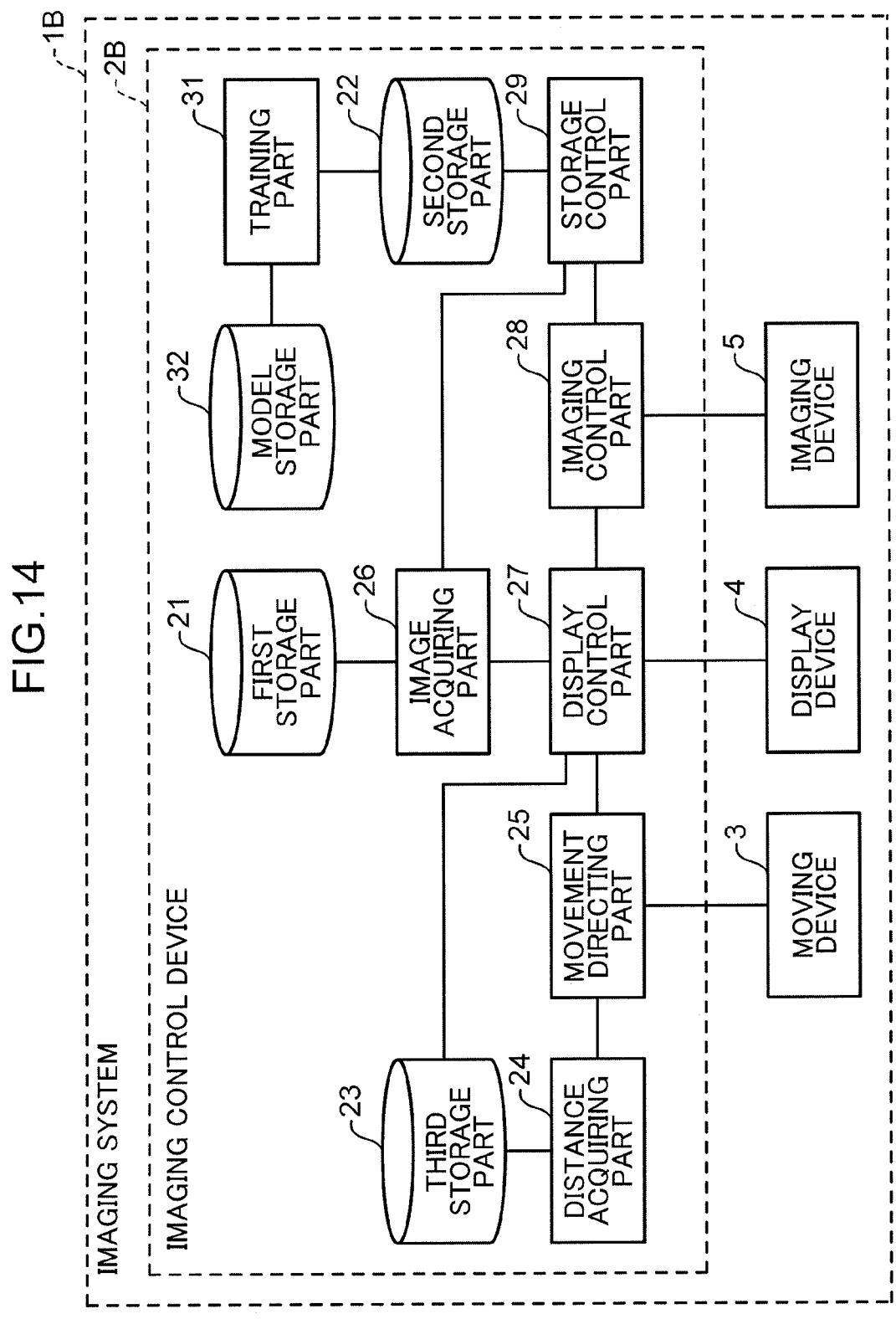
FIG. 14 is a block diagram illustrating an example of an overall configuration of an imaging system according to a third embodiment of the present disclosure.

FIG. 14 is a block diagram illustrating an example of an overall configuration of an imaging system 1B according to the third embodiment of the present disclosure. In FIG. 14, the same components as those in FIG. 1 are denoted by the same reference numerals, and description thereof is omitted.

The imaging system 1B includes an imaging control device 2B, the moving device 3, the display device 4, and the imaging device 5.

The imaging control device 2B includes the first storage part 21, the second storage part 22, the third storage part 23, the distance acquiring part 24, the movement directing part 25, the image acquiring part 26, the display control part 27, the imaging control part 28, the storage control part 29, a training part 31, and a model storage part 32.

The training part 31 trains the machine learning model using the data set including the set of the second training image and the correct answer information stored in the second storage part 22. In the third embodiment, the machine learning model applied to an identifier is a machine learning model using a neural network such as deep learning, but may be another machine learning model. For example, the machine learning model may be a machine learning model using random forest, genetic programming, or the like.

The machine learning in the training part 31 is implemented by, for example, an error back propagation (BP) method in deep learning or the like. Specifically, the training part 31 inputs the second training image to the machine learning model and acquires a recognition result output from the machine learning model. Then, the training part 31 adjusts the machine learning model so that the recognition result becomes correct answer information. The training part 31 repeats adjustment of the machine learning model for a plurality of sets (for example, several thousand sets) of different second training images and correct answer information to improve the recognition accuracy of the machine learning model.

The model storage part 32 stores a trained machine learning model. The machine learning model is also an image recognition model used for image recognition.

In the third embodiment, although the imaging control device 2B includes the training part 31 and the model storage part 32, the present disclosure is not particularly limited thereto, and an external computer connected to the imaging control device 2B via a network may include the training part 31 and the model storage part 32. In this case, the imaging control device 2B may further include a communication part that transmits the data sets to the external computer. Furthermore, the external computer connected to the imaging control device 2B via the network may include the model storage part 32. In this case, the imaging control device 2B may further include a communication part that transmits the trained machine learning model to the external computer.

The imaging system 1B of the third embodiment can use depth information of a subject included in parallax information as training data, and this is effective for improving the recognition capability of the machine learning model. For example, the machine learning model can recognize that an object appearing small in an image is a subject existing far away, and can prevent the object from being recognized as dirt, that is, from being ignored. Therefore, the machine learning model constructed by the machine learning using the second training image can improve the recognition performance.

The imaging system 1B according to the third embodiment displays the first training image stored in the first storage part 21, stores a plurality of second training images acquired by changing the distance between the display device 4 and the imaging device 5 in the second storage part 22, and uses the plurality of stored second training images for training. In the training processing, the training part 31 may use the plurality of second training images stored in the second storage part 22. The training part 31 may not use all the second training images, but may randomly select only some of the second training images and use only some of the selected second training images. Further, the training part 31 may replace only some of the plurality of second training images to create one image in which the second training images having various depths are connected like a patchwork, and use the created image for training.

As described above, the imaging system 1B is effective not only for training to optimize parameters of the machine learning but also for optimizing device parameters of the imaging device In a case where the multi-pinhole camera is used as the imaging device 5, the recognition performance and the privacy protection performance of the imaging device 5 depend on device parameters such as the size of each pinhole, the shape of each pinhole, the arrangement of each pinhole, and the number of pinholes. Therefore, in order to achieve an optimal recognition system, it is necessary to optimize not only the parameters of machine learning but also the device parameters of the imaging device 5, such as the size of each pinhole, the shape of each pinhole, the arrangement of each pinhole, and the number of pinholes. The imaging system 1B according to the third embodiment trains and evaluates the second training image acquired when the device parameters of the imaging device 5 are changed to be able to select a device parameter having a high recognition rate and high privacy protection performance as an optimal device parameter.

In each of the above embodiments, each component may be implemented by being configured with dedicated hardware or by execution of a software program suitable for each component. Each component may be implemented by a program execution unit, such as a central processing unit (CPU) or a processor, reading and executing a software program recorded in a recording medium such as a hard disk or a semiconductor memory. In addition, the program may be recorded in a recording medium and transferred, or the program may be transferred via a network to carry out the program using another independent computer system.

Some or all of the functions of the devices according to the embodiments of the present disclosure are implemented as large scale integration (LSI), which is typically an integrated circuit. These may be individually integrated into one chip, or may be integrated into one chip so as to include some or all of them. In addition, the circuit integration is not limited to LSI, and may be implemented by a dedicated circuit or a general-purpose processor. A field programmable gate array (FPGA), which can be programmed after manufacturing of LSI, or a reconfigurable processor in which connections and setting of circuit cells inside LSI can be reconfigured may be used. Some or all of the functions of the devices according to the embodiments of the present disclosure may be implemented by a processor such as a CPU executing a program.

The numbers used above are all illustrated to specifically describe the present disclosure, and the present disclosure is not limited to the illustrated numbers.

The order in which each step illustrated in the above flowcharts is executed is for specifically describing the present disclosure, and may be any order other than the above order as long as a similar effect is obtained. Some of the above steps may be executed simultaneously (in parallel) with other steps.

INDUSTRIAL APPLICABILITY

The technology of the present disclosure can improve the recognition accuracy of a machine learning model while protecting the privacy of a subject, and thus is useful as a technology of creating a data set to be used for training of the machine learning model.

The invention claimed is:

1. An information processing system, comprising:
a processor; and
a memory including a program that, when executed by the processor, causes the processor to:
acquire a first training image of a machine learning model from a first storage;
acquire a distance between a display device and an imaging device that acquires a blurred image by imaging;

cause the display device to display the first training image based on the distance;
cause the imaging device to capture the first training image displayed on the display device to acquire a second training image, and
store a data set including a set of the second training image acquired by the imaging device and annotation information associated with the first training image in a second storage,
wherein the processor changes, when the distance is changed, a display size of the first training image so that a size of the second training image acquired by the imaging device is maintained, and causes the display device to display the first training image having the changed display size, and
wherein the processor causes the imaging device to capture the first training image when the distance is changed.

2. The information processing system according to claim 1, wherein the program, when executed by the processor, further causes the processor to direct a change of the distance between the display device and the imaging device.

3. The information processing system according to claim 2,
wherein the processor directs the change of the distance more than once,
wherein the processor changes the display size of the first training image so that the size of the second training image acquired by the imaging device is maintained every time the distance is changed more than once, and causes the display device to display the first training image having the changed display size,
wherein the processor causes the imaging device to capture the first training image every time the distance is changed more than once to acquire a plurality of the second training images, and
wherein the processor stores a second data set including a second set of each of the plurality of the second training images acquired by the imaging device and the annotation information in the second storage.

4. The information processing system according to claim 2, wherein the processor directs a moving device that moves at least one of the imaging device and the display device to move at least one of the imaging device and the display device.

5. The information processing system according to claim 4, wherein the processor moves at least one of the imaging device and the display device in an optical axis direction of the imaging device.

6. The information processing system according to claim 4, wherein the processor moves at least one of the imaging device and the display device in a direction intersecting an optical axis direction of the imaging device.

7. The information processing system according to claim 1, wherein the processor acquires the distance from a distance measuring device that measures the distance between the display device and the imaging device.

8. The information processing system according to claim 1, wherein the first training image stored in the first storage is an image without blurring acquired by another imaging device different from the imaging device.

9. The information processing system according to claim 1, wherein the processor changes the display size of the first training image in proportion to the distance between the display device and the imaging device.

10. The information processing system according to claim 1, wherein the program, when executed by the processor, further causes the processor to train the machine learning model using the data set including the set of the second training image and the annotation information, the data set being stored in the second storage.

11. The information processing system according to claim 1, wherein the annotation information associated with the first training image is stored in the first storage, and the processor acquires the annotation information from the first storage.

12. The information processing system according to claim 1, wherein the annotation information associated with the first training image is stored in the first storage, and the processor acquires the annotation information from the first storage to output the acquired annotation information to a storage control part.

13. An information processing method with which a computer performs the information processing method, the information processing method comprising:

acquiring a first training image of a machine learning model from a first storage;

acquiring a distance between a display device and an imaging device that acquires a blurred image by imaging;

causing the display device to display the first training image based on the distance;

causing the imaging device to capture the first training image displayed on the display device to acquire a second training image; and storing a data set including a set of the second training image acquired by the imaging device and annotation information associated with the first training image in a second storage, wherein in the displaying of the first training image, when the distance is changed, a display size of the first training image is changed so that a size of the second training image acquired by the imaging device is maintained, and the display device is caused to display the first training image having the changed display size, and in the acquiring of the second training image, when the distance is changed, the imaging device is caused to capture the first training image.

\* \* \* \* \*